(12) United States Patent
Cao

(10) Patent No.: US 11,583,071 B1
(45) Date of Patent: Feb. 21, 2023

(54) FOLDABLE SHELF CONVENIENT TO TRANSPORT AND ASSEMBLE

(71) Applicant: Xin Cao, Guangdong (CN)

(72) Inventor: Xin Cao, Guangdong (CN)

( * ) Notice: Subject to any disclaimer, the term of this patent is extended or adjusted under 35 U.S.C. 154(b) by 0 days.

(21) Appl. No.: 17/522,912

(22) Filed: Nov. 10, 2021

(30) Foreign Application Priority Data

Oct. 29, 2021 (CN) .......................... 202122629232.1

(51) Int. Cl.
*A47B 43/00* (2006.01)
*A47B 45/00* (2006.01)
*A47F 5/10* (2006.01)

(52) U.S. Cl.
CPC .............. *A47B 43/00* (2013.01); *A47B 45/00* (2013.01); *A47F 5/10* (2013.01)

(58) Field of Classification Search
CPC . A47B 43/00; A47B 45/00; A47F 5/10; A47F 5/103
USPC .......................................................... 211/195
See application file for complete search history.

(56) References Cited

U.S. PATENT DOCUMENTS

| 1,769,140 | A | * | 7/1930 | Kaufman | ................ | A47B 43/00 211/202 |
| 2,260,294 | A | * | 10/1941 | Brown | ..................... | A47F 7/175 211/44 |
| 2,819,938 | A | * | 1/1958 | Zerver | ................... | B25H 3/026 312/201 |
| 2,885,090 | A | * | 5/1959 | Forman | ...................... | A47F 7/24 211/175 |
| 2,901,124 | A | * | 8/1959 | Carle | ........................ | A47F 7/24 108/177 |
| 3,163,296 | A | * | 12/1964 | Hohnstein | ............... | A47B 43/00 211/126.6 |
| 3,463,265 | A | * | 8/1969 | Clover | ..................... | E04G 1/34 182/119 |
| 4,258,631 | A | * | 3/1981 | Brown | ................... | A47B 43/00 108/53.5 |
| 8,196,761 | B2 | * | 6/2012 | Morandi | .............. | A47B 96/021 211/186 |
| D703,412 | S | * | 4/2014 | Snider | ........................... | D34/21 |
| 8,950,602 | B2 | * | 2/2015 | Fanourgiakis | ........ | A47F 5/0018 211/175 |
| D734,914 | S | * | 7/2015 | Tsai | .............................. | D34/21 |
| 9,364,104 | B1 | * | 6/2016 | Wood | ..................... | A47G 25/06 |

(Continued)

FOREIGN PATENT DOCUMENTS

CH 518702 A * 2/1972
DE 3206278 A1 * 9/1983

(Continued)

*Primary Examiner* — Stanton L Krycinski

(57) ABSTRACT

A foldable shelf convenient to transport and assemble, including at least two storage members and vertical rods installed on two sides of the storage members, where the vertical rods each includes a fixed rod relatively fixed to one side of the bottom storage member and at least one folding rod; a lower end of one folding rod adjacent to the fixed rod is hinged to an upper end of the fixed rod; the storage member at the bottom is disposed on an inner side of the fixed rod, two sides of each of other storage members are fixedly connected to sliding blocks, and the sliding blocks each sleeve the vertical rod and are capable of sliding along the fixed rod on the vertical rod and the folding rod; and a fastening device is disposed between the sliding block and the folding rod.

10 Claims, 6 Drawing Sheets

(56) References Cited

U.S. PATENT DOCUMENTS

| | | | |
|---|---|---|---|
| 9,370,277 B2 * | 6/2016 | Weaver | A47J 47/16 |
| 9,534,834 B1 * | 1/2017 | Klassen | A47B 96/025 |
| 9,545,137 B2 * | 1/2017 | Frankel | A45C 7/0036 |
| D785,979 S * | 5/2017 | Snider | D6/675.1 |
| 9,648,949 B1 * | 5/2017 | Penaflor | B65B 45/00 |
| 9,936,825 B1 * | 4/2018 | Lindblom | A47F 5/0087 |
| 10,172,749 B2 * | 1/2019 | Richardson | A61G 1/013 |
| D852,448 S * | 6/2019 | Hu | D34/21 |
| D852,449 S * | 6/2019 | Hu | D34/21 |
| 10,337,136 B1 * | 7/2019 | Fallah | A47B 43/00 |
| D871,117 S * | 12/2019 | Johnson | D6/675.3 |
| 10,543,592 B2 * | 1/2020 | Esposito | A47B 31/00 |
| D889,171 S * | 7/2020 | Cao | D6/681.2 |
| D899,826 S * | 10/2020 | Cheng | D34/21 |
| D947,583 S * | 4/2022 | Li | D6/681.2 |
| 2007/0272642 A1 * | 11/2007 | Baptiste | A47B 43/00 211/201 |
| 2010/0288717 A1 * | 11/2010 | Morandi | A47B 55/02 211/187 |
| 2011/0253660 A1 * | 10/2011 | Pong | A47B 43/00 211/198 |
| 2013/0055604 A1 * | 3/2013 | Herman Baran | A47B 45/00 40/606.03 |
| 2013/0106270 A1 * | 5/2013 | Lin | B25H 1/0042 312/327 |
| 2018/0295981 A1 * | 10/2018 | Frankel | A47F 5/13 |

FOREIGN PATENT DOCUMENTS

| | | | |
|---|---|---|---|
| DE | 29515633 U1 * | 1/1996 | |
| FR | 2458244 A1 * | 1/1981 | |
| KR | 20090003933 U * | 4/2009 | |
| KR | 20090105722 A * | 10/2009 | |
| WO | WO-2006040591 A1 * | 4/2006 | A47B 43/00 |

* cited by examiner

FOLDABLE SHELF CONVENIENT TO TRANSPORT AND ASSEMBLE

BACKGROUND OF THE INVENTION

The present disclosure relates to the field of shelf technologies, and in particular, to a foldable shelf convenient to transport and assemble.

A shelf is used to place items. There is a larger demand for shelves in domestic and commercial use. In the prior art, the shelf is usually complex in structure, is inconvenient to transport, and is difficult to assemble for a user. A structure design of the shelf needs to be improved.

BRIEF SUMMARY OF THE INVENTION

An objective of the present disclosure is to overcome the foregoing shortcomings in the prior art, and provide a foldable shelf convenient to transport and assemble to mainly solve the technical problem that an existing shelf is inconvenient to transport and assemble for a user.

To implement the foregoing objective, the present disclosure provides a foldable shelf convenient to transport and assemble, including at least two storage members arranged in a vertical direction and vertical rods installed on two sides of the storage members, where the vertical rods each includes a fixed rod relatively fixed to one side of the bottom storage member and at least one folding rod; a lower end of one folding rod adjacent to the fixed rod is hinged to an upper end of the fixed rod; the storage member at the bottom is disposed on an inner side of the fixed rod, two sides of each of other storage members are fixedly connected to sliding blocks, and the sliding blocks each sleeve the vertical rod and are capable of sliding along the fixed rod on the vertical rod and the folding rod; a fastening device is disposed between the sliding block and the folding rod; when the fastening device is in a fastening state, the sliding block sleeves the folding rod and the sliding block is fixedly connected to the folding rod, and in this case, the shelf is in an unfolded state; when the fastening device is in a loosened state, the sliding block is capable of sliding into the fixed rod along the folding rod, the storage members are stacked into a whole, then the folding rod is folded relative to the fixed rod, and in this case, the shelf is in a folded state.

Preferably, the fastening device is an automatic fastening device, and the fastening device is used to fix the sliding block on the folding rod, so that each storage member is in a relatively fixed state on the vertical rod.

As a preferred implementation of the fastening device, the fastening device is an elastic protruding point disposed on the folding rod, and the sliding block is provided with a first positioning hole matching the elastic protruding point.

Preferably, at least three storage members are provided, and the sliding block is provided with at least one avoidance hole.

As another preferred implementation of the fastening device, the fastening device includes a spring fixing seat relatively fixed to the sliding block, a top block installed on a middle portion of the spring fixing seat, and a spring installed between the spring fixing seat and the top block; the folding rod is provided with a second positioning hole, and the spring drives a head of the top block to be embedded in the second positioning hole, so that the sliding block is fixedly connected to the folding rod.

Preferably, the fastening device further includes a handle fixed to a tail of the top block, and the tail of the spring fixing seat is provided with a recessed groove, and when the handle is embedded in the groove, the spring drives the head of the top block to be embedded in the second positioning hole. The fastening device in this technical solution can further increase the user's assembly speed and improve user experience.

Preferably, one end of the folding rod hinged to the fixed rod is provided with an avoidance notch. The avoidance notch can solve the problem that the folding rod interferes with the fixed rod during folding.

Preferably, the storage member is a storage basket or a storage laminate board.

Preferably, the sliding block is a linear bearing.

Preferably, the bottom of the bottom storage member is provided with a base, and casters are disposed around the bottom of the base.

Compared with the prior art, the present disclosure has the following beneficial effects:

Before delivery and transportation, fastening devices are loosened first, so that sliding blocks on two sides of each storage member (that is, all storage members except the bottom storage member) can slide down along the folding rods. After the sliding blocks on two sides of the storage members slide from folding rods into fixed rods, because a lower end of each of the folding rods is hinged to an upper end of one fixed rod, the folding rods can be folded. After folding, the structural volume of the shelf is greatly reduced, thereby facilitating subsequent transportation and reducing transportation costs.

When a user assembles the shelf of this technical solution, the folding rods can be folded upward first to make the folding rods and the fixed rods in a vertical state. In this case, all storage members except the bottom storage member are separately lifted upward. In this case, the sliding blocks on two sides of the lifted storage members also slide from the fixed rods to the folding rods, and then the sliding blocks are fixed to the folding rods by the fastening devices, so that all storage members are in a relatively fixed state on the vertical rods respectively, and in this case, the assembly of the shelf is completed.

Storage baskets of this technical solution can not only greatly reduce the transportation volume and reduce transportation costs, but also facilitate assembly by the user. During assembly, the user only needs to first unfold the folding rods, then lift the storage members upward, and finally uses the fastening devices to fix the storage members, so that the installation operation can be completed. No professional person is required in the installation process. The shelf has the advantages of simple structure and low assembly difficulty.

BRIEF DESCRIPTION OF THE DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may derive other accompanying drawings from these accompanying drawings without creative efforts.

REFERENCE NUMERALS

1. Storage member; 2. Vertical rod; 21. Fixed rod; 22. Folding rod; 221. Avoidance notch; 3. Sliding block; 31. First positioning hole; 32. Avoidance hole; 4. Fastening device; 40. Second positioning hole; 41. Spring fixing seat; 42. Top block; 43. Spring; 44. Handle; 411. Groove; 5. Base; 6. Caster; 9. Hinge point.

DETAILED DESCRIPTION OF THE INVENTION

To make the objectives, technical solutions and advantages of the embodiments of the present disclosure clearer, the following clearly and completely describes the technical solutions in the embodiments of the present disclosure with reference to accompanying drawings in the embodiments of the present disclosure. Apparently, the described embodiments are some rather than all of the embodiments. All other embodiments obtained by a person of ordinary skill in the art based on the embodiments of the present disclosure without creative efforts shall fall within the protection scope of the present disclosure.

Embodiment 1

Figure 1:
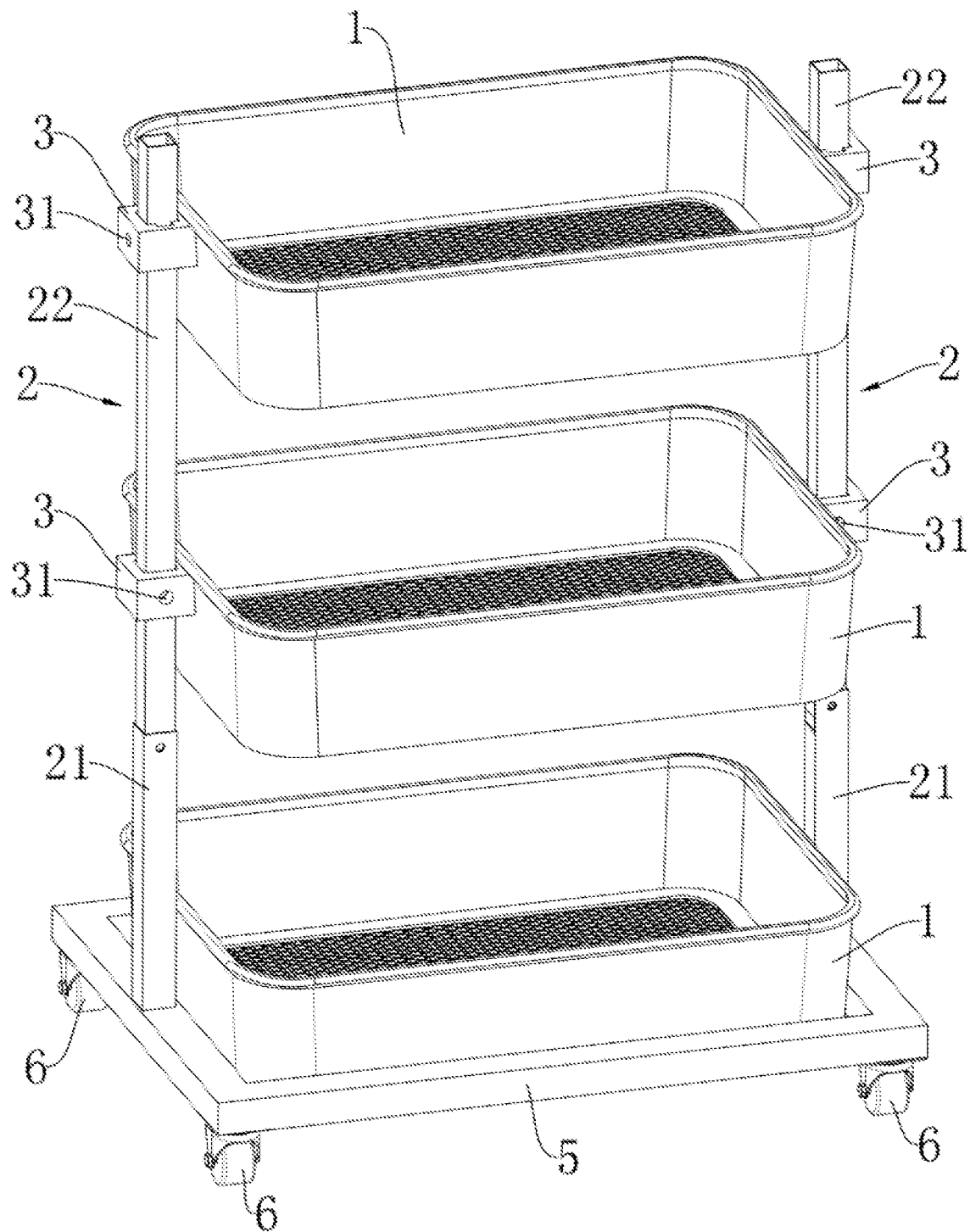
FIG. 1 is a schematic structural diagram of an assembled foldable shelf convenient to transport and assemble according to the present disclosure.
Figure 2:
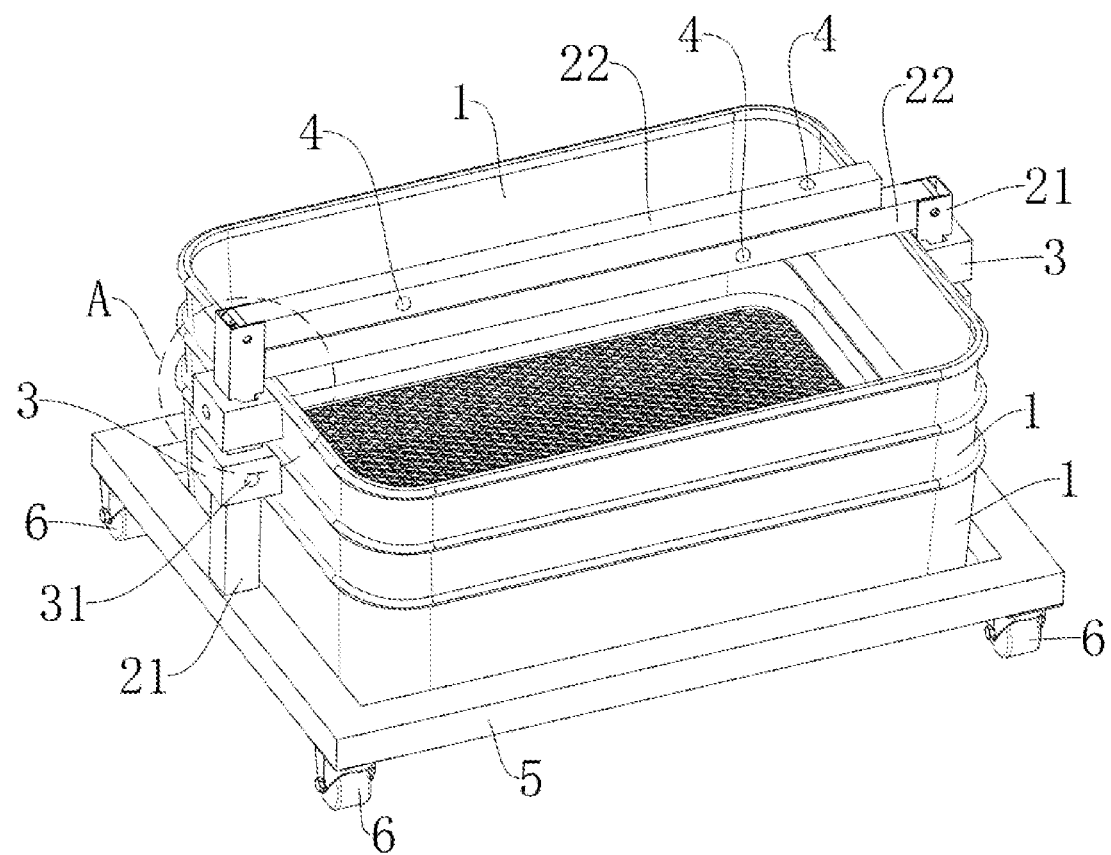
FIG. 2 is a schematic structural diagram of a foldable shelf convenient to transport and assemble during transportation after folding according to the present disclosure.

The technical solution of this embodiment mainly solves the problem that a storage basket is inconvenient to transport and difficult to assemble due to its larger volume. Referring to FIG. 1 and FIG. 2, the present disclosure provides a foldable shelf convenient to transport and assemble, including at least two storage members 1 arranged in a vertical direction and vertical rods 2 installed on two sides of the storage members 1. The storage members 1 each may be a storage basket shown in FIG. 1, or may be a storage laminate board. As shown in FIG. 1, in this embodiment, the storage members 1 are preferably storage baskets, and three storage baskets are provided preferably. In addition, two sides of the storage members 1 each may be provided with one vertical rod 2 as shown in FIG. 1, or two sides of the storage members 1 each may be provided with two vertical rods 2. The number of the vertical rods 2 is related to shapes and sizes of the storage members 1.

Figure 3:
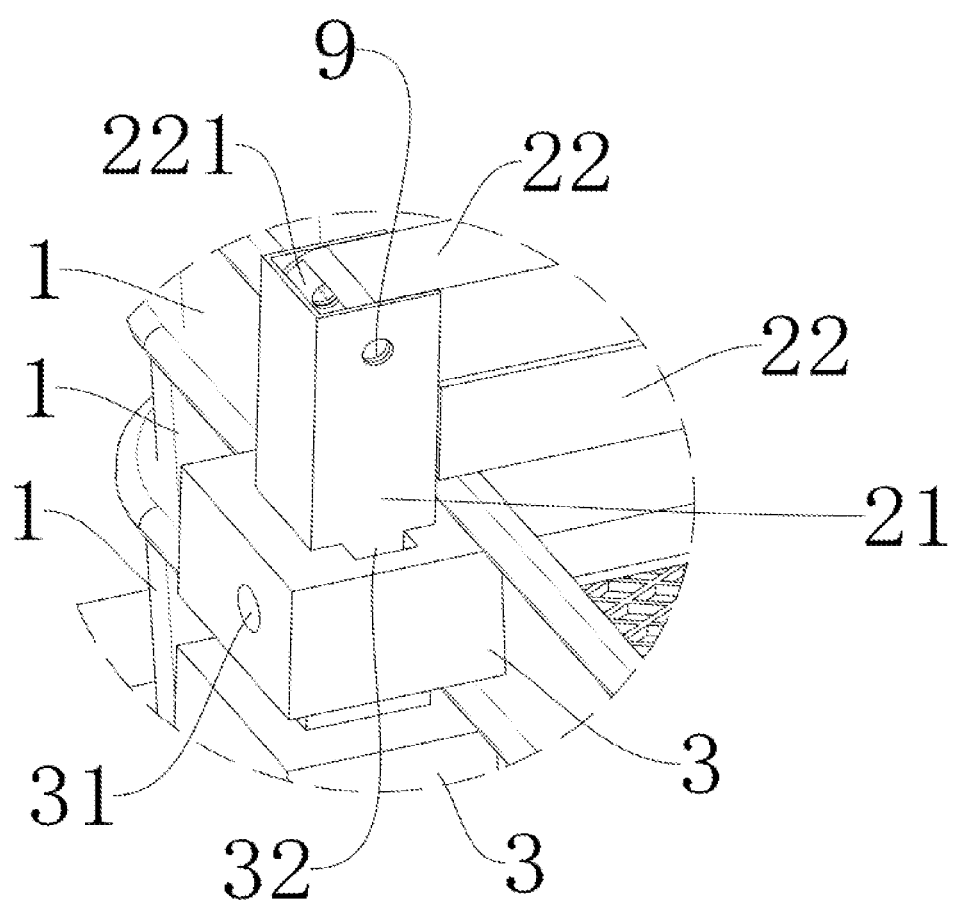
FIG. 3 is a partial enlarged view of a position A in FIG. 2.

Specifically, referring to FIG. 1 to FIG. 3, in this embodiment, the vertical rods 2 each includes a fixed rod 21 and at least one folding rod 22. The fixed rod 21 is fixed to one side of the bottom storage member 1, and a lower end of one folding rod 22 adjacent to the fixed rod 21 is hinged to an upper end of the fixed rod 21. It should be noted herein that if the length of the vertical rod 2 is excessively large, two or more folding rods 22 may be provided. Every two adjacent folding rods 22 are hinged to each other to achieve the purpose of folding for many times and reduce the transportation volume. In addition, one end of the folding rod 22 hinged to the fixed rod 21 is provided with an avoidance notch 221. The avoidance notch 221 can solve the problem that the folding rod 22 interferes with the fixed rod 21 during folding.

More specifically, referring to FIG. 1 and FIG. 2, the storage member 1 at the bottom is fixed to an inner side of the fixed rod 21, two sides of each of all the storage members 1 except the bottom storage member 1 are fixedly connected to sliding blocks 3, and the sliding blocks 3 each sleeve the vertical rod 2 and are capable of sliding along the fixed rod 21 on the vertical rod 2 and the folding rod 22. In addition, a fastening device 4 is disposed between the sliding block 3 and the folding rod 22, so that the sliding block 3 is fixed to the folding rod 22, and therefore each storage member 1 can be fixed to the vertical rod 2. The fastening device 4 may be a conventional screw locking device or a buckle connection device.

Specifically, referring to FIG. 1 to FIG. 3, before delivery and transportation, fastening devices 4 are loosened first, so that sliding blocks 3 on two sides of each storage member 1 (that is, all storage members 1 except the bottom storage member 1) can slide down along the folding rods 22. After the sliding blocks 3 on two sides of the storage members 1 slide from folding rods 22 into fixed rods 21, because a lower end of each of the folding rods 22 is hinged to an upper end of one fixed rod 21, the folding rods 22 can be folded. After folding, the structural volume of the shelf is greatly reduced (as shown in FIG. 2), thereby facilitating subsequent transportation and reducing transportation costs.

Referring to FIG. 1 to FIG. 3, when a user assembles the shelf of this technical solution, the folding rods 22 can be folded upward first to make the folding rods 22 and the fixed rods 21 in a vertical state. In this case, all storage members 1 except the bottom storage member 1 are separately lifted upward. In this case, the sliding blocks 3 on two sides of the lifted storage members 1 also slide from the fixed rods 21 to the folding rods 22, and then the sliding blocks 3 are fixed to the folding rods 22 by the fastening devices 4, so that all storage members 1 are in a relatively fixed state on the vertical rods 2 respectively, and in this case, the assembly of the shelf is completed (as shown in FIG. 1).

The top of the shelf of this technical solution may be further provided with an armrest which facilitates pushing of the shelf, one end of the armrest is connected to the upper end of the vertical rod 2 on one side of the storage member 1, and the other end of the armrest is connected to the upper end of the vertical rod 2 on the other side of the storage member 1.

In conclusion, the shelf of this technical solution can not only greatly reduce the transportation volume and transportation costs, but also facilitate assembly by the user. During assembly, the user only needs to first unfold the folding rods 22, then lift the storage members 1 upward, and finally uses the fastening devices 4 to fix the storage members 1, so that the installation operation can be completed. No professional person is required in the installation process. The shelf has the advantages of simple structure and low assembly difficulty.

Figure 4:
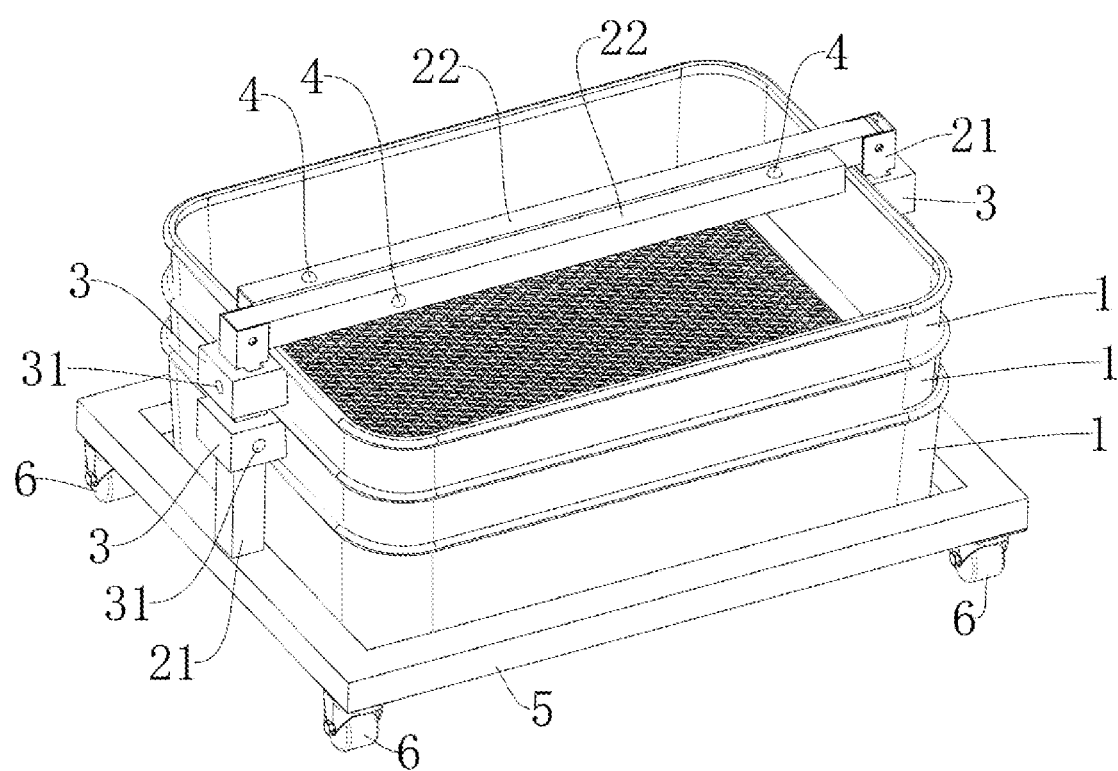
FIG. 4 is another schematic structural diagram of an assembled foldable shelf convenient to transport and assemble during transportation after folding according to the present disclosure.

In addition, in this embodiment, it needs to be further noted that as shown in FIG. 2 and FIG. 3, when the sliding blocks 3 on two sides are oppositely arranged, there is a certain height difference between hinge points 9 at which the folding rods 22 on two sides are hinged to the fixed rods 21, so as to avoid mutual interference between the two folding rods 22 after folding. Certainly, referring to FIG. 4, the sliding blocks 3 on two sides may alternatively be staggered, which can also avoid mutual interference between the two folding rods 22 after folding.

Embodiment 2

To further lower the installation difficulty, further improve installation efficiency and improve user experience, this embodiment provides another foldable shelf convenient to transport and assemble in which a fastening device 4 is designed as an automatic fastening device while the remaining structure is the same as that of Embodiment 1. Details are not described again.

Specifically, referring to FIG. 1 to FIG. 3, the fastening device 4 is an elastic protruding point disposed on the folding rod 22, and the sliding block 3 is provided with a first positioning hole 31 matching the elastic protruding point. Specifically, during assembly by the user, the user first unfolds each folding rod 22, and then lifts each storage member 1 upward. When the storage member 1 reaches a designated position, the head of the elastic protruding point on the folding rod 22 is automatically embedded into the first positioning hole 31 in the sliding block 3, so as to implement fixed connection between the sliding block 3 and the folding rod 22, thereby completing the assembly process of the storage member 1. The fastening device 4 of this technical solution can further increase the user's assembly speed and improve user experience.

Further, when at least two storage members 1 are provided, in this embodiment, each sliding block 3 is further provided with at least one avoidance hole 32. Through the avoidance hole 32, each sliding block 3 can be quickly lifted to a position of the elastic protruding point that matches and is positioned with the sliding block 3, and each sliding block 3 is not limited by the elastic protruding point below the sliding block 3. Certainly, as shown in FIG. 2, in this case, several elastic protruding points on the folding rod 22 should also be staggered.

Embodiment 3

Figure 5:
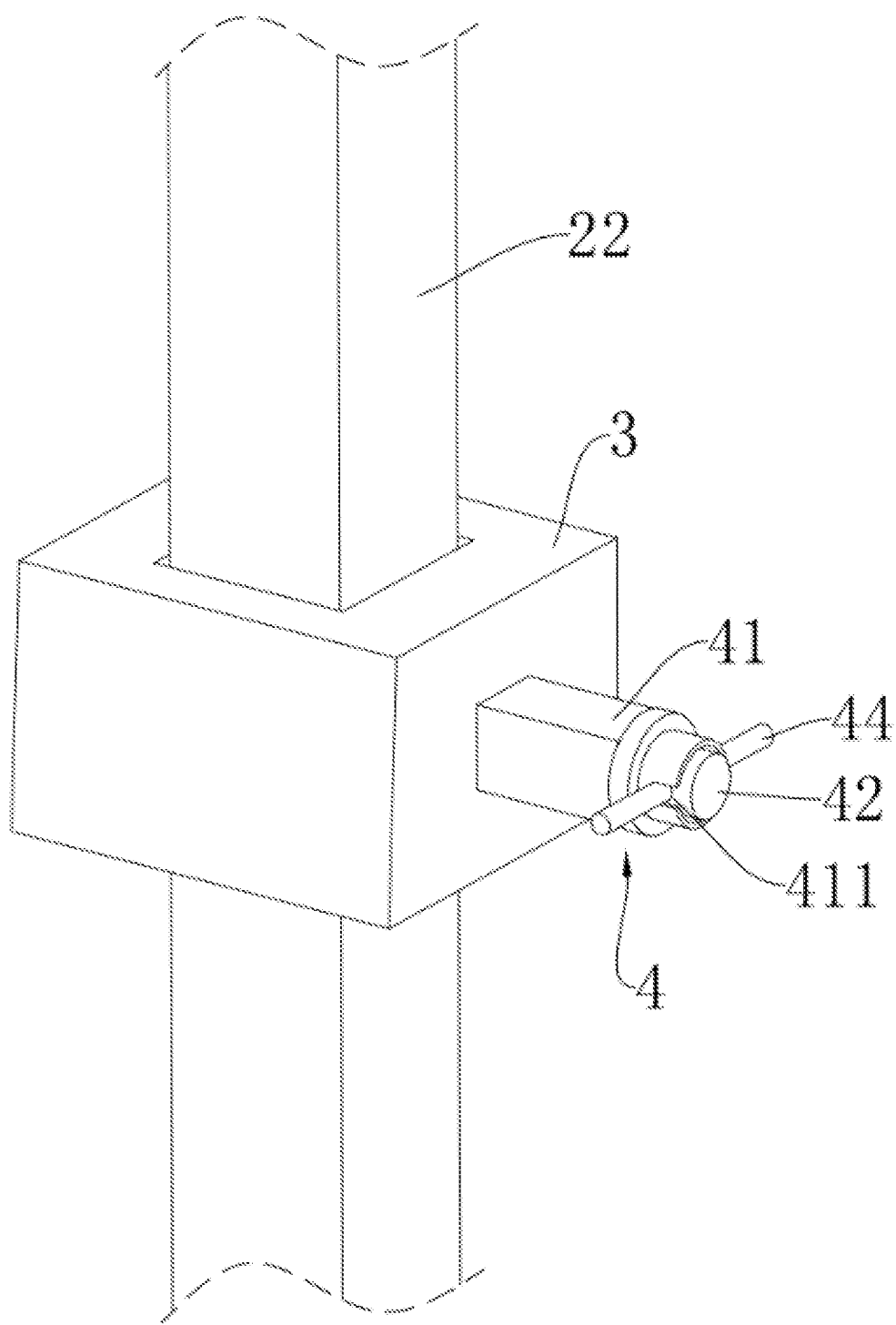
FIG. 5 is a schematic structural diagram of a fastening device in Embodiment 3 of the present disclosure.
Figure 6:
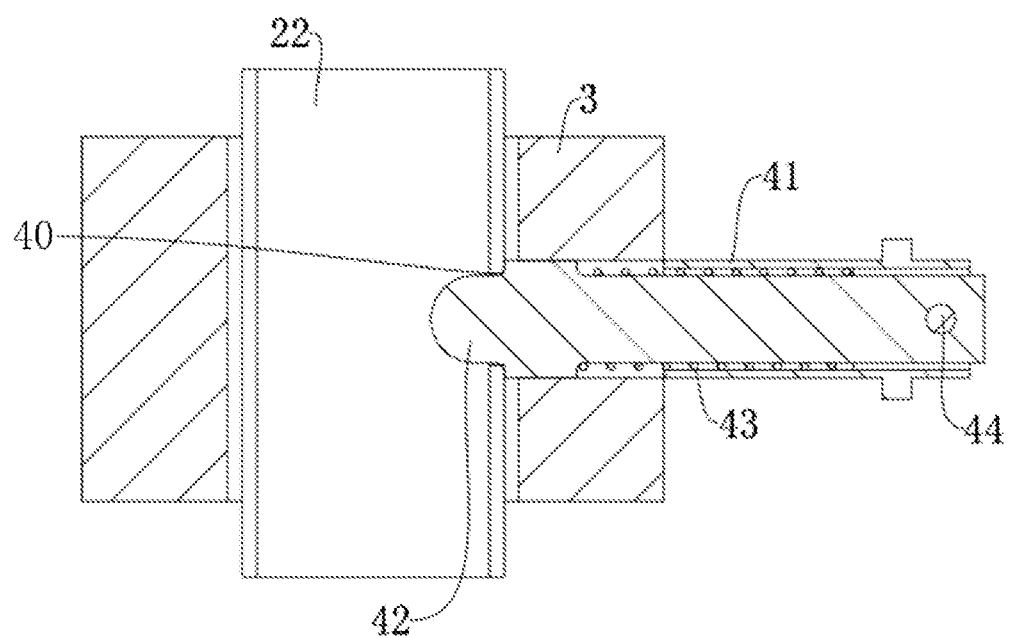
FIG. 6 is an internal schematic structural diagram of a fastening device in Embodiment 3 of the present disclosure.

Referring to FIG. 5 and FIG. 6, the present disclosure provides another foldable shelf convenient to transport and assemble in which a fastening device 4 is designed as another automatic fastening device while the remaining structure is the same as that of Embodiment 1. Details are not described again.

In this embodiment, the fastening device 4 includes a spring fixing seat 41, a top block 42, a spring 43, and a handle 44. The spring fixing seat 41 is fixed to an outer side of the sliding block 3, the top block 42 is installed on a middle portion of the spring fixing seat 41, the spring 43 is installed between the spring fixing seat 41 and the top block 42, one end of the spring 43 abuts against the spring fixing seat 41, the other end thereof abuts against the top block 42, and the handle 44 is fixed to the tail of the top block 42. In addition, the folding rod 22 is provided with a second positioning hole 40, and the tail of the spring fixing seat 41 is provided with a recessed groove 411.

Specifically, before the user lifts each storage member 1, the handle 44 is separated from the groove 411 first, so that the top block 42 is in a retracting state in the spring fixing seat 41. After the storage member 1 is lifted to a proper position, the handle 44 is rotated to embed the handle 44 into the groove 411. In this case, the spring 43 drives the top block 42 to extend outward, and the head of the top block 42 is embedded into the second positioning hole 40 in the folding rod 22. Because the spring fixing seat 41 is relatively fixed to the sliding block 3, the fixed connection between the sliding block 3 and the folding rod 22 can be implemented, and the assembly of the storage member 1 is completed.

The fastening device 4 of this technical solution can further increase the user's assembly speed and improve user experience.

Embodiment 4

Referring to FIG. 1 and FIG. 2, this embodiment provides another foldable shelf convenient to transport and assemble on which each sliding block 3 may be a linear bearing. Certainly, in this case, the vertical rod 2 is round, and the remaining structure is the same as that of Embodiment 1. Details are not described again.

In addition, as shown in FIG. 1 and FIG. 2, in this embodiment, the bottom of the bottom storage member 1 is provided with a base 5, and casters 6 are fixed around the bottom of the base 5. On the one hand, the base 5 functions to lower the center of gravity, and on the other hand, the base 5 also facilitates installation of several casters 6. The casters 6 are arranged to enable the user to easily move the shelf to a designated position, and further improve user experience.

The foregoing embodiments are preferred implementations of the present disclosure, but the implementations of the present disclosure are not limited by the foregoing embodiments. Any other changes, modifications, replacements, combinations and simplifications made without departing from the spirit and principle of the present disclosure shall be equivalent replacement methods, and shall fall within the protection scope of the present disclosure.

What is claimed is:

1. A foldable shelf convenient to transport and assemble, comprising at least two storage members (1) arranged in a vertical direction and vertical rods (2) installed on two sides of the storage members (1), wherein the vertical rods (2) each comprises a fixed rod (21) relatively fixed to one side of a bottom storage member (1) and at least one folding rod (22); a lower end of one of the folding rods (22) adjacent to the fixed rod (21) is hinged to an upper end of the fixed rod (21);

the bottom storage member (1) disposed on an inner side of the fixed rod (21), two sides of each of the other storage members (1) are fixedly connected to sliding blocks (3), and the sliding blocks (3) each sleeve a respective one of the vertical rods (2) and are capable of sliding along the fixed rod (21) on the vertical rod (2) and the folding rod (22); and a fastening device (4) is disposed between the sliding block (3) and the folding rod (22);

when the fastening device (4) is in a fastening state, the sliding block (3) sleeves the folding rod (22) and the sliding block (3) is fixedly connected to the folding rod (22), and the shelf is in an unfolded state; when the fastening device (4) is in a loosened state, the sliding block (3) is capable of sliding into the fixed rod (21) along the folding rod (22), the storage members (1) are stacked into a whole, then the folding rod (22) is folded relative to the fixed rod (21), and the shelf is in a folded state.

2. The foldable shelf convenient to transport and assemble according to claim 1, wherein the fastening device (4) is an automatic fastening device.

3. The foldable shelf convenient to transport and assemble according to claim 2, wherein the fastening device (4) is an elastic protruding point disposed on the folding rod (22), and the sliding block (3) is provided with a first positioning hole (31) matching the elastic protruding point.

4. The foldable shelf convenient to transport and assemble according to claim 3, wherein at least three of the storage members (1) are provided, and the sliding block (3) is provided with at least one avoidance hole (32).

5. The foldable shelf convenient to transport and assemble according to claim 2, wherein the fastening device (4) comprises a spring fixing seat (41) relatively fixed to the sliding block (3), a top block (42) installed on a middle portion of the spring fixing seat (41), and a spring (43) installed between the spring fixing seat (41) and the top block (42); and the folding rod (22) is provided with a positioning hole (40), and the spring (43) drives a head of the top block (42) to be embedded in the positioning hole (40), so that the sliding block (3) is fixedly connected to the folding rod (22).

6. The foldable shelf convenient to transport and assemble according to claim 5, wherein the fastening device (4) further comprises a handle (44) fixed to a tail of the top block (42), and the tail of the spring fixing seat (41) is provided with a recessed groove (411), and when the handle (44) is embedded in the groove (411), the spring (43) drives the head of the top block (42) to be embedded in the positioning hole (40).

7. The foldable shelf convenient to transport and assemble according to claim 1, wherein one end of the folding rod (22) hinged to the fixed rod (21) is provided with an avoidance notch (221).

8. The foldable shelf convenient to transport and assemble according to claim 1, wherein the storage members (1) are storage baskets or storage laminate boards.

9. The foldable shelf convenient to transport and assemble according to claim 1, wherein the sliding block (3) is a linear bearing.

10. The foldable shelf convenient to transport and assemble according to claim 1, wherein the bottom of the bottom storage member (1) is provided with a base (5), and casters (6) are disposed around the bottom of the base (5).

* * * * *